United States Patent [19]

Ciechanowski et al.

[11] Patent Number: 4,597,551

[45] Date of Patent: Jul. 1, 1986

[54] VACUUM WAND HOLDER

[75] Inventors: Mark Ciechanowski, Long Beach; Robin C. Faraday, Irvine, both of Calif.

[73] Assignee: Rockwell International Corporation, El Segundo, Calif.

[21] Appl. No.: 709,640

[22] Filed: Mar. 8, 1985

[51] Int. Cl.[4] .............................................. A47F 5/00
[52] U.S. Cl. ................................... 248/314; 248/297.2
[58] Field of Search .................. 248/314, 297.2, 295.1, 248/538, 534, 205.3, 205.4; 239/282, 283; 4/610, 615, 596, 597, 601, 605

[56] References Cited

U.S. PATENT DOCUMENTS 2,471,825  5/1949  Long .................................... 248/314
2,912,196  11/1959  Johnson .............................. 248/538
3,505,760  4/1970  Ambrose ......................... 248/534 X

*Primary Examiner*—Ramon S. Britts
*Assistant Examiner*—Ramon O. Ramirez
*Attorney, Agent, or Firm*—H. Fredrick Hamann; S. Alfred Uchizono

[57] ABSTRACT

A surface-mounted apparatus for holding an elongated hand-held instrument, such as a vacuum wand, when not in use, the instrument having a flexible tube-like extension attached to the end inserted in the apparatus, the apparatus comprising an elongated cylindrical shell affixed to a mounting plate, the cylindrical shell having a smoothly tapered longitudinal slot extending from an upper end to near the lower end of the shell, the slot of width sufficient to allow unconstrained passage of the tube-like extension, and the shell of inner diameter sufficient to easily accommodate insertion of the end to be inserted into the shell provided the instrument is rotated to align the extension to pass through the slot during insertion, the mounting plate used to attach the apparatus to a surface in an orientation favorable to the use of the force of gravity to cradle the instrument in the shell against random dislodging forces. The slot width is selected in consideration of the instrument dimensions and the shell wall thickness and flexibility to allow for quick removal of the instrument from the holder by the forcible passage of the instrument through the slot by elastic deformation of the slot.

8 Claims, 12 Drawing Figures

VACUUM WAND HOLDER

The present invention relates to an apparatus for holding an elongated hand-held instrument when that instrument is not in use, and more specifically where that instrument is a vacuum wand, commonly referred to as a vacuum "tweezer".

BACKGROUND OF THE INVENTION

The use of available collar-like devices for holding a vacuum wand where that vacuum wand has a spring loaded pneumatic switch protruding outwardly from one end of the elongated wand, has caused damage to this pneumatic switch because the weight of the wand, as well as the vacuum hose attached thereto, was placed on or hung from the switch itself. Additionally, these existing devices were also tedious to use because of the difficulty of guiding the vacuum wand into and removing the vacuum wand from the holder without damaging the wand itself. Typically, vacuum wands are used in the semiconductor industry for delicately picking up semiconductor wafers for transporting such wafers from one location to another. These operations typically take place in a clean room environment, and therefore, a wand holder which in its installation and its use promotes the cleanliness of the general environment is also highly desirable.

SUMMARY OF THE INVENTION

It is therefore a purpose of the present invention to provide a holder into which vacuum wands can easily be placed and removed therefrom without damage to the wand itself.

It is a further purpose of this invention to provide a holder for instruments of a variety of types for convenient placement into and removal therefrom. Such instruments are nitrogen and air guns, hand-held mini-grinders, medical and dental instruments, probes for oscilloscopes, probe leads for multi meters and thermometers, microphones, and probe leads for a variety of electronic test equipment. Possible home uses of such a holder might include as a holder for curling irons, blow dryers, and a variety of hand-crafting power tools. Tools without cords could also be placed into and stored in such a holder, such tools including scissors, household cutlery, and other kitchen utensils.

The present invention comprises an apparatus for holding an elongated hand-held instrument when that instrument is not in use, where the instrument has a flexible tube-like or cord-like extension attached to the end inserted into the holder. The apparatus comprises an elongated cylindrical shell having an upper end, a lower end, and a smoothly tapered longitudinal slot extending from the upper end to near the lower end and a means for attaching the apparatus to a surface in an orientation favorable to the use of the force of gravity to cradle the instrument in the shell against random dislodging forces. The slot width is selected in consideration of the cross sectional dimension of the instrument to be held and the wall thickness and flexibility of the shell such as to allow for the removal of the instrument from the holder by the forceable passage of the instrument causing elastic deformation of the slot by pulling the exposed end of the instrument toward the slot and pivoting the instrument about the point where the tube-like extension comes into contact with the bottom edge of the slot as the instrument is drawn outwardly. Another method of removing the instrument from the holder is to lift the instrument out of the holder while keeping the tube-like extension aligned in the slot. This method of removal does not necessarily involve the forceable deformation of the slot.

One means for attaching the apparatus to a surface comprises a fastener attached to and extending outwardly from the mounting surface at an angle relative to vertical allowing the shell to be hung therefrom by a mounting hole near the upper end of the cylindrical shell opposite the slot.

Another means for attaching the apparatus to a surface comprises a mounting plate affixed to the shell, the location of the mounting plate affixed to the shell depending both upon the orientation of the surface to which it is to be mounted as well as the surface of the shell to which the mounting plate is attached.

The present invention also considers an apparatus for holding an elongated vacuum wand when not in use, where the wand has a flexible vacuum hose attached to a first end and having a finger-operated pneumatic switch extending outwardly from the opposite end, the apparatus comprising a planar mounting plate and elongated cylindrical shell having a slot similar to that described above and also having a partially tapered lower end, the lower end planarly tapered on the side opposite the slot and providing an edge surface to which a mounting plate is fixedly attached. The mounting plate in turn is attached to a mounting surface, typically a vertical surface to favorably use the force of gravity to cradle the wand in the shell against dislodging forces. The mounting plate is typically fixedly attached to the shell by adhesive bonding.

DESCRIPTION OF THE PREFERRED EMBODIMENT

Figure 1:
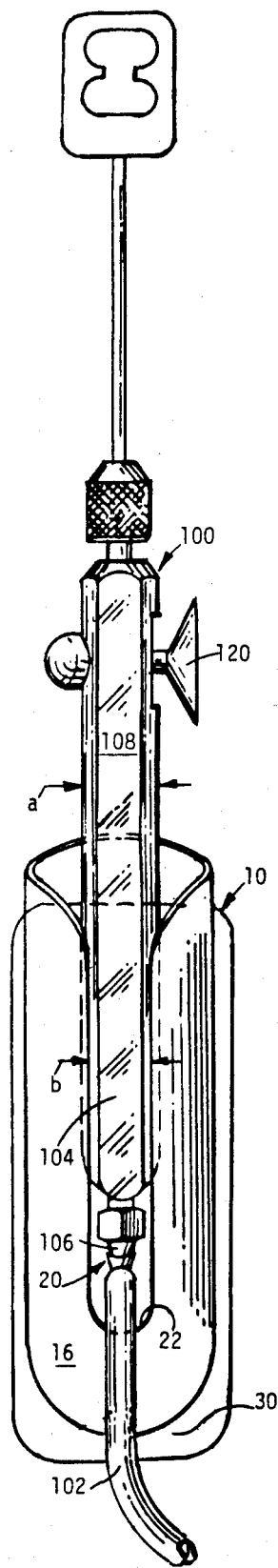
FIG. 1 is a front view in elevation of the present invention with the held instrument shown placed in the holder.

The present invention is a holder for a vacuum wand (also known as a vacuum tweezer) used for semiconductor wafer handling in the semiconductor industry. In FIG. 1, a preferred embodiment of the present invention is shown in use, wherein a vacuum wand 100 is shown cradled in the holder 10 of the present invention. The tube-like extension 102 extending from the bottom end 104 of the vacuum wand 100 is a vacuum hose attached to the fitting 106. The vacuum wand body 108 is a rigid member and therefore in order for the vacuum hose 102 to exit through the slot 20 of the holder 10, the hose 102 must bend slightly forward out of the plane of the drawing such as to clear the bottom edge 22 of the slot 20. Note that in its cradled position, the vacuum wand body 108 is not free to be pulled out of the holder in a forward direction because the cross-sectional dimension a of the vacuum wand body 108 is greater than the normal undeformed slot width b of the cylindrical shell 16. A mounting plate 30 is shown behind the cylindrical shell 16. The cylindrical shell 16 is adhesively bonded to the mounting plate 30. In turn, the mounting plate 30 is itself attached to a surface of choice. In a clean-room environment, it has been found desirable to use double backed adhesive tape to bound the holder to that surface. In many df the clean-room applications, the surface of choice is the vertical surface of a table leg. In a typical embodiment, the cylindrical shell 16 is made from PVC tubing and the mounting plate 30 is made from styrene or polypropylene. Adhesive bonding of the shell 16 to the plate 30 can be adequately realized using hot glue.

Figure 2:
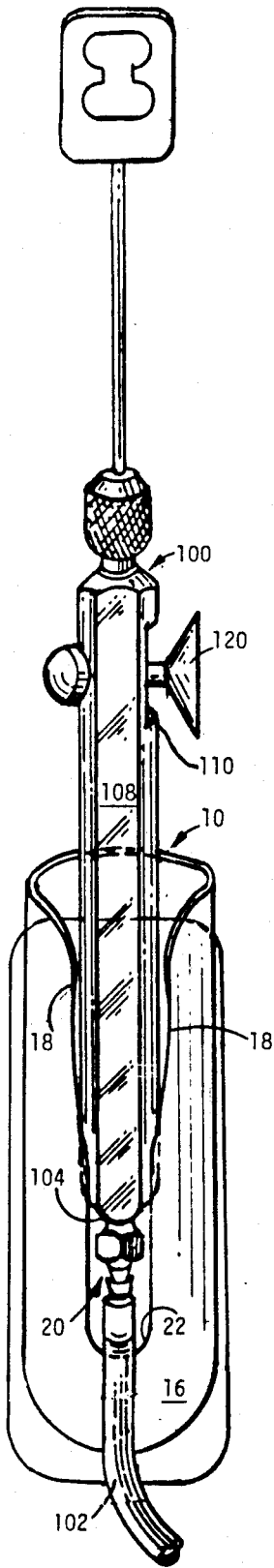
FIG. 2 is a front view in elevation showing the forceable removal of the instrument through the elastic front slot as it is at the point where the slot is widened apart.

Turning now to FIG. 2, a different view of the embodiment of FIG. 1 is presented. In this figure, the wand 100 is shown in a position where it is being forceably removed through the slot 20 of the cylindrical shell 16. The wand 100 is removed from the holder 10 by pulling forward on the upper portion 110 of the wand such that the body 108 pushes aside the edges 18 of the slot wide enough to remove the wand 100 from the holder. Forceable removal in this fashion, is effected by the wand upper portion 110 being tilted forward and causing the wand bottom portion 104 to move in a backward direction. The limits as to how far this bottom portion 104 can move backwards is established by the presence of the vacuum hose extension 102 attached to the wand 100 itself. As the wand is tilted forward at the top, the bottom 104 tends to move back but eventually the hose 102 makes contact with the bottom edge 22 of the slot 102 thereby allowing the exercise of a pivoting leverage to push aside the somewhat elastic edges 18 of the slot. The slot width b is designed to permit this forceable removal to take place with a comfortable amount of forward force being applied at the upper end 110 of the wand 100. The relationship between the slot width b and the cross-sectional dimension a of the wand are determined by the amount of force that is desireably required to remove the wand in thls quick removal technique taking into consideration the flexibility of the cylindrical shell and its wall thickness. Some consideration must be given to the extent to which the vacuum hose 102 can withstand the repeated force applied at the point where it makes contact with the bottom edge 22 of the slot. However, since the vacuum hose 102 is a relatively expendable material, in that it may be cut off and reattached to the fixture 106 should a break or fracture occur, this consideration is not a major limitation.

Placement of the wand 100 into the holder 10 is achieved by dropping the wand into the cylindrical shell lower end 104 first, guiding the hose 102 to pass through the slot 20 as the wand is inserted in the holder. Removal can also be achieved by reversing this procedure by lifting the wand from the holder. However, in actual use, as users become adept at handling the wand and placing it into the holder, it is convenient to have a quick removal motion such as has just been described with reference to FIG. 2. In point of fact, this quick removal process becomes the norm as the user becomes experienced at using the wand in conjunction with the holder. Another aspect of the workers adeptness that comes into play, is where the cross-sectional dimensions of the wand are nonuniform, such that the dimension a shown in FIG. 1 may be the dimension of the wand body when oriented as shown. However, with an asymmetrical cross-section, rotation of the wand by 90 degrees in the holder can cause front-viewed cross-sectional profile to be greater or lesser than the dimension a shown in FIG. 1. The slot width b, nevertheless, must always be less than the minimum cross-sectional dimension of the wand body 108, otherwise the wand could fall out of the holder 10. As the user becomes experienced in the use of the holder, it is expected that by finger touch it is possible to rotate the wand in the holder about its longitudinal axis such that a minimum dimension profile is presented to the slot edges 18 during the forced removal extraction depicted in FIG. 2 thereby reducing the magnitude of force required to remove the wand.

One of the features of the present invention is the relative freedom from damage to the push button vacuum switch 120. In other existing holder devices for such wands, the wand is cradled in the holder and allowed to come to rest in a vertical position resting on the bottom side of the vacuum switch mechanism itself. Over a period of time, damage to the switch would result necesitating costly repairs or replacement of the vacuum switch 120 or of the wand itself.

Figure 3:
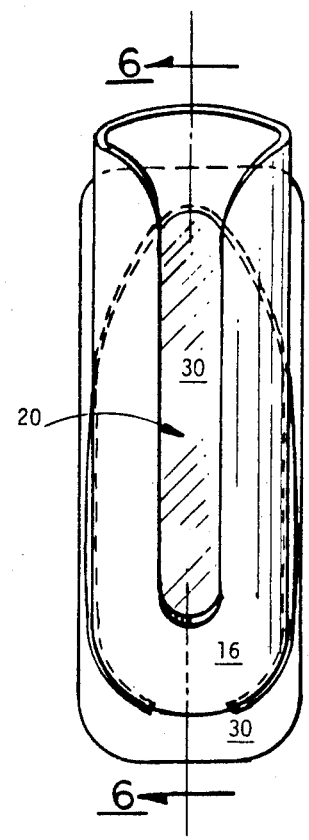
FIG. 3 is a front view in elevation of the present invention with the held instrument removed.
Figure 4:
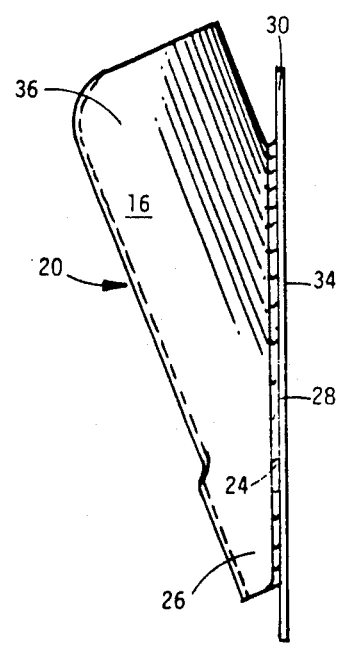
FIG. 4 is a side view in elevation of the present invention with the held instrument removed.
Figure 6:
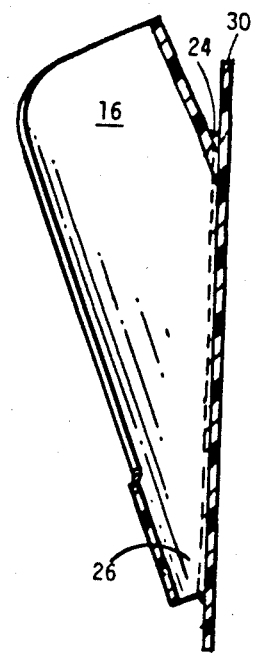
FIG. 6 is a cross sectional view of FIG. 3 taken along the line 6—6.
Figure 5:
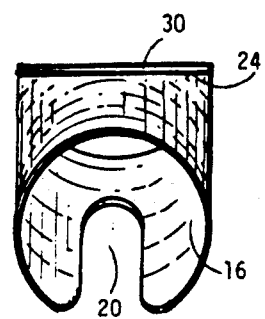
FIG. 5 is a top view in elevation of the present invention with the held instrument removed.

FIGS. 3 through 6, show different views of the embodiment shown in FIG. 1 where the vacuum wand instrument is removed. FIG. 3 is a front elevation view, FIG. 4 is a side elevation view, FIG. 5 is a top view, and FIG. 6 shows a cross-sectional view taken along the lines 6—6 of FIG. 3. In FIGS. 4 and 6, it can be seen that there is a taper of the cylindrical shell 16 such that the lower end 26 of the cylindrical shell is narrower than the upper end 36. Note that the edge 28 of the tapered portion is opposite the slot 20. This tapered portion has an edge 28 defining a plane. The mounting plate 30 is adhesively secured to the shell 16 at the edge 28 using an appropriate bonding agent forming an acute angle 29 between the plate and the shell. In one design, a hot glue adhesive was found to provide adequate bonding between the cylindrical shell 16 and the mounting plate 30. On the side 34 opposite the cylindrical shell, the mounting plate can be secured to a vertical structural member, such as a table leg, using double backed adhesive tape (not shown). At the innerface of the cylindrical shell edge 28 and the mounting plate 30, a glue bead 24 is shown. In the FIG. 6 cross-sectional view it can be seen that the lower end 26 of the cylindrical shell 16 is not enclosed. This feature prevents the accumulation of debris and allows for ease of washing the holder. Both of these features are important where the holder is to be used in a clean-room environment. For a semiconductor processing environment, a cleanroom environment is usually the norm.

Figure 7:
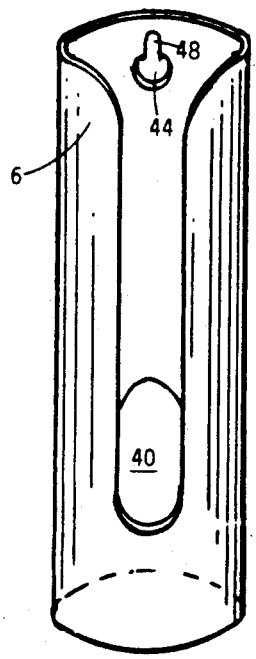
FIG. 7 is a front view in elevation of another embodiment of the present invention.
Figure 8:
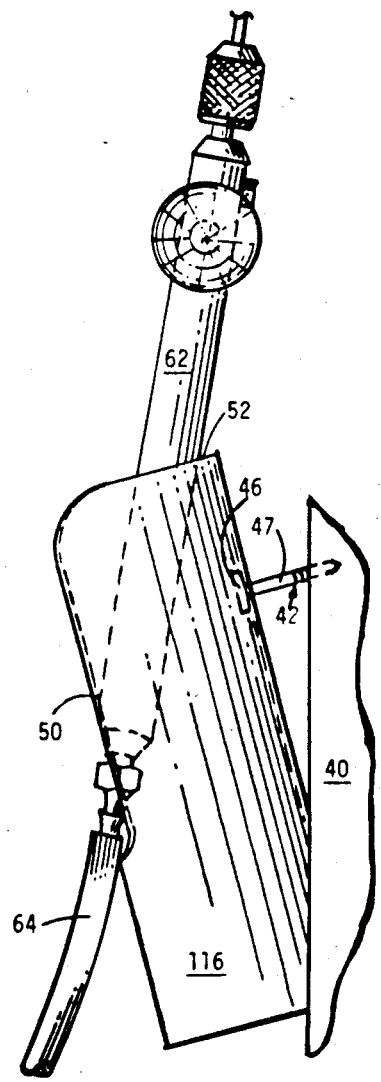
FIG. 8 is the side view in elevation of the embodiment of FIG. 7 with the held instrument partially shown placed in the holder.

In FIGS. 7 and 8, another embodiment of the present invention is presented. FIG. 7 is a front view in elevation and FIG. 8 is a side view in elevation of this embodiment.

In this embodiment, a surface-mounted apparatus for holding an elongated hand-held instrument when not in use, is presented where the instrument has a flexible tube-like extension attached to the inserted end of the instrument.

In FIG. 7, it can be seen that a mounting plate such as is shown in FIGS. 1 through 6 of the previous embodiment is absent. In this configuration, the cylindrical shell 116 is suspended from a vertical member 40 shown in FIG. 8 by the use of a fastener 42 which is fixedly attached to the vertical member 40 and which extends essentially horizontally out from that vertical member. The head 46 of the fastener is larger than the stem 47 of the fastener. When the shell 116 is hung on the fastener 42 by resting the shell 116 on the fastener 42 by placing the fastener through the aperture 44, gravity pulls the shell down to the point where the shell comes to rest with respect to the fastener with the fastener in the slotted portion 48 of the aperture.

In FIG. 8, the bottom portion of an instrument is shown held by the apparatus of the present invention showing a body 62 and a tube-like extension 64 attached to the inserted end of the instrument 62. The method of quick extraction is similar to that which has been described with respect to the embodiment of FIGS. 1 through 6. Additionally, the method of placing the instrument into the holder as well as the method of lifting the instrument out of the holder is also similar. From this side view of FIG. 8, it can be seen that a point of contact between the instrument body 62 and the shell 46 occurs at points 50 and 52. In those applications where the holder is mounted such as to hold the held instrument in a near vertical orientation, the points of contact are similarly located in the other configurations discussed herein, as well as in the configuration of FIGS. 1 through 6 where a side view of the implaced instrument is not available.

Figure 9:
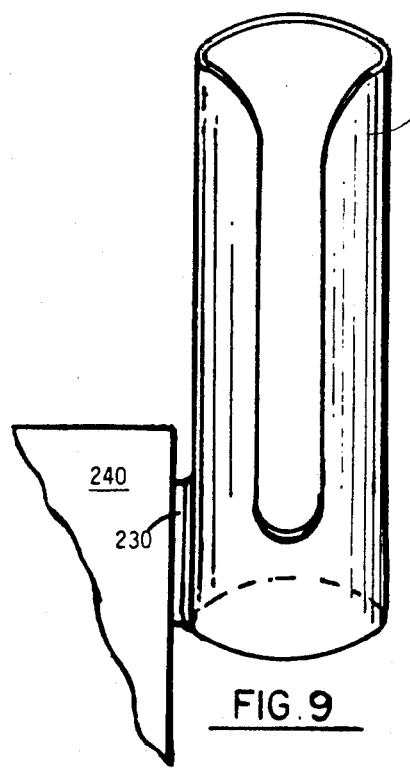
FIG. 9 shows a front view in elevation of another embodiment of the present invention.
Figure 10:
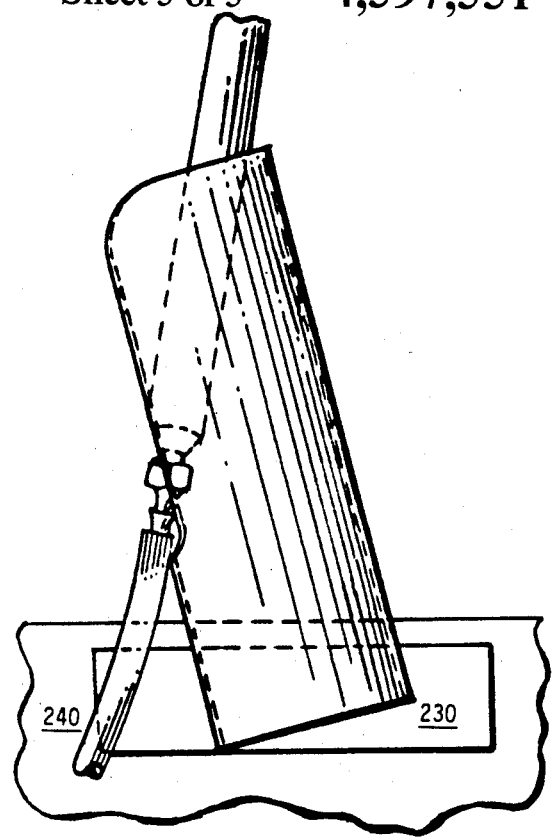
FIG. 10 is a side view in elevation of the embodiment of FIG. 9 with the held instrument shown in place.

FIGS. 9 and 10 are the front and side elevation views of another embodiment of the present invention wherein the mounting plate 230 is fixedly attached to the side of the cylindrical shell 216. The embodiment of FIGS. 9 and 10 is applicable typically for mounting on a vertical surface where the vertical surface is in a plane paralell to the direction of the quick removal action described with reference to FIGS. 1 through 6 above. The other features are identical to that which are described with respect to that earlier described embodiment. In FIGS. 9 and 10, the cylindrical shell 216 is shown attached at the lower end of the shell to the mounting plate 230. As described earlier, the mounting plate itself can be attached to the vertical member 240 by use of some appropriate adhesive, such as double back adhesive tape, though other means such as by screw fasteners may also be used to screw the mounting plate to the vertical member.

Figure 11:
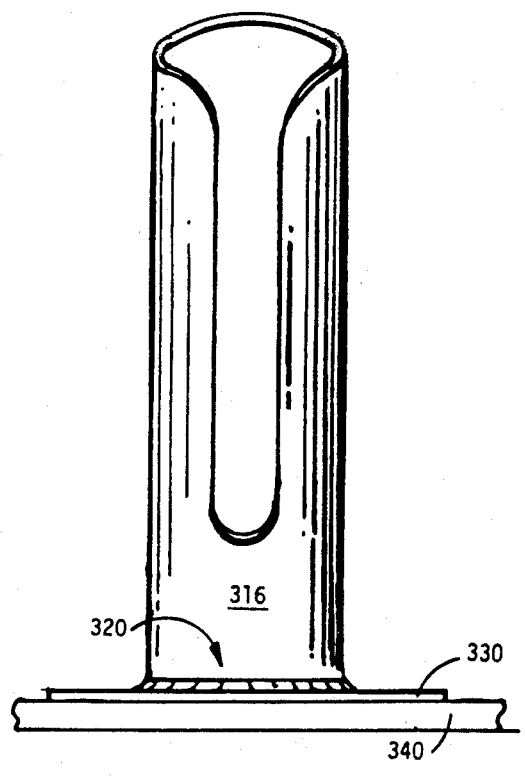
FIG. 11 is a front view in elevation of another embodiment of the present invention.
Figure 12:
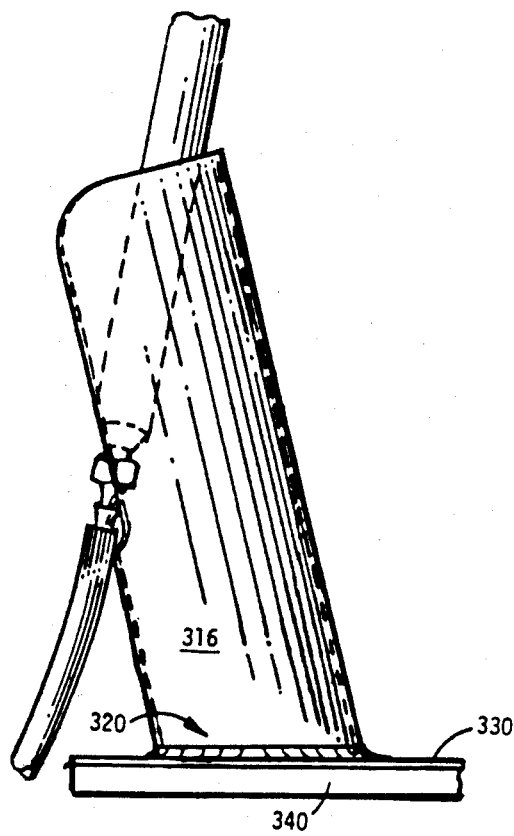
FIG. 12 is a side view in elevation of the embodiment of FIG. 11 with the held instrument in place in the holder.

FIGS. 11 and 12 present a front and side view in elevation of another embodiment of the present invention showing a different mode of attachment of the mounting plate to the cylindrical shell. In FIGS. 11 and 12, it can be seen that the mounting plate 330 is designed to attach to a basically horizontal surface such as a table top, as represented by structure 340 of FIGS. 11 and 12. The other features of the shell 316 are similar to those described earlier. One difference here is that no provision is provided for the easy removal of accumulated residue in the bottom of the shell 320. Attachment of the shell 316 to the mounting plate 330 is made by bonding the two pieces together at the lower end of the cylindrical shell. As indicated earlier, a variety of methods are available for this bonding. One adequate method of bonding these two elements together is by the use of hot glue.

Though the above descriptions have been restricted to the use of the present invention to hold a vacuum wand in the holder of the present invention, it is clear that by modifying the basic concept of the present invention such as by increasing or decreasing the diameter of the cylindrical shell and in adjusting the slot width accordingly or using other than a circular cross-sectional shape, e.g., square, ellipse, triangle, diamond, octagon, etc., that other types of instruments could be held by a holder based on the present invention. Instruments such as nitrogen and air guns, hand-held mini grinders, medical and dental instruments, probes for oscilloscopes, probes for multimeters and thermometers, microphones, and probes for a variety of electronic test equipment can all be cradled in holders based on a minor modification of the present invention. Such modifications could be easily made by those skilled in the art. It is further noted that where an unusual shell cross-section is desired or where cost tradeoffs dictate, fabrication by one skilled in the art can be achieved by using an injection molding process to create an integral unit of shell and mounting plate together.

Although the invention has been described and illustrated in detail, it is clearly understood that the same is by way of illustration only and is not to be taken by way of limitation, the spirit and scope of this invention being limited only by the terms of the appended claims.

What is claimed is:

1. A surface-mounted apparatus for holding an elongated hand-held instrument when not in use, said instrument having a flexible tube-like extension attached to an inserted end, said apparatus comprising:

an elongated cylindrical shell having an upper end, a lower end, and a longitudinal slot extending from said upper end to near said lower end and smoothly tapered at its upper end, said slot of width sufficient to allow unconstrained passage of said tube-like extension and of width selected in joint consideration of the cross-sectional dimension of said instrument and said shell wall thickness and flexibility such as to allow for the removal of said instrument from said holder by the forcible passage of said instrument causing elastic deformation of said slot by pulling the exposed end of said instrument towards said slot and pivoting said instrument about the point where the tube-like extension comes into contact with the bottom of said slot as the instrument is drawn outward, and said shell of inner diameter sufficient to easily accommodate insertion therein of said inserted end of said instrument provided said instrument is rotated to align said tube-like extension to pass through said slot during insertion; and a mounting plate affixed to said shell for attaching said apparatus to a surface in an orientation favorable to the use of the force of gravity to cradle said instrument in said shell against random dislodging forces.

2. The apparatus according to claim 1, wherein said mounting plate is affixed to the outer side wall of said shell at an orientation allowing mounting to a vertical surface in conformance with a desired orientation of said shell.

3. The apparatus according to claim 1, wherein said mounting plate is affixed to said lower end of said shell for mounting on an approximately horizontal surface.

4. The apparatus according to claim 1, wherein said shell has a planar tapered portion at said lower end opposite said slot to which said mounting plate is affixed, said plate and said shell forming an acute angle therebetween.

5. An apparatus for holding an elongated vacuum wand when not in use, said wand having a flexible vacuum hose attached to a first end and having finger operated switches extending outwardly from said opposite end, said apparatus comprising:

a planar mounting plate; and an elongated cylindrical shell having a flat upper end, a partially tapered lower end, and a smoothly tapered longitudinal slot extending from said upper end to near said lower end, said slot of width sufficient to allow unconstrained passage of said hose, and said shell of inner diameter approximately twice the largest cross-sectional dimension of said wand to easily accommodate insertion therein of said first end of said wand provided said wand is rotated to align said hose to pass through said slot during insertion;

said lower end planarly tapered on the side opposite said slot;

said mounting plate fixedly attached to said shell forming an acute angle between the upper portion of said shell and the portion of said mounting plate coextensive with said upper portion of said shell;

said mounting plate mounted on a vertical surface to favorably use the force of gravity to cradle said wand in said shell against random dislodging forces.

6. The apparatus according to claim 5, wherein said mounting plate is fixedly attached to said shell by adhesive bonding.

7. The apparatus according to claim 6, wherein:

said mounting plate is made of high impact styrene;

said shell is made from PVC tubing having nominal wall thickness of 1/16 of an inch; and said slot width is approximately ¼ of an inch less than the nominal cross sectional dimension of said instrument.

8. The apparatus according to claim 7, wherein double-backed adhesive tape is used on the mouhting plate to mount said apparatus to a mounting surface.

* * * * *